United States Patent [19]

Ito

[11] Patent Number: 5,068,744
[45] Date of Patent: Nov. 26, 1991

[54] PICTURE DATA COMPRESSING AND RECORDING APPARATUS FOR RECORDING COMPONENTS OF THE PICTURE INDEPENDENTLY

[75] Inventor: Kenji Ito, Tokyo, Japan

[73] Assignee: Fuji Photo Film Co., Ltd., Kanagawa, Japan

[21] Appl. No.: 407,293

[22] Filed: Sep. 14, 1989

[30] Foreign Application Priority Data

Oct. 14, 1988 [JP] Japan .............................. 63-257076
Mar. 6, 1989 [JP] Japan .................................. 1-51869

[51] Int. Cl.$^5$ ............................................. H04N 5/76
[52] U.S. Cl. ..................................... 358/310; 358/335
[58] Field of Search ............... 358/133, 134, 135, 136, 358/137, 138, 426, 466, 467, 430, 432, 433, 310, 80, 331; 360/32, 48, 60, 9.1, 33.1

[56] References Cited

U.S. PATENT DOCUMENTS

| | | | |
|---|---|---|---|
| 4,580,162 | 4/1986 | Mori | 358/138 |
| 4,633,330 | 12/1986 | Yamamitsu et al. | 358/310 |
| 4,791,623 | 12/1988 | Deiotte | 300/48 |
| 4,887,151 | 12/1989 | Wataya | 358/80 |
| 4,910,724 | 3/1990 | Sakagami et al. | 369/100 |
| 4,984,076 | 1/1991 | Watanabe et al. | 358/133 |

OTHER PUBLICATIONS

Wen-Hsiung Chen, et al., "Scene Adaptive Coder", IEEE Trans. on Comm. vol. COM-32, No. 3, pp. 225-232 (1984).

*Primary Examiner*—Roy N. Envall, Jr.
*Assistant Examiner*—Huy Nguyen

[57] ABSTRACT

A picture data compressing and recording apparatus divides picture data into blocks and applies two-dimensional orthogonal transformation to the blocks of picture data. The apparatus records DC components and AC components of the transformed data collectively yet, independently of each other in a recording medium. The apparatus is capable of reproducing a simplified picture by reading out the DC component only. The apparatus is also capable of recording a luminance signal Y and chrominance signals Cr and Cb independently of each other and reading out the luminance signal Y only so as to reproduce a black-and-white picture.

13 Claims, 10 Drawing Sheets

FIG. 2

FIG. 7
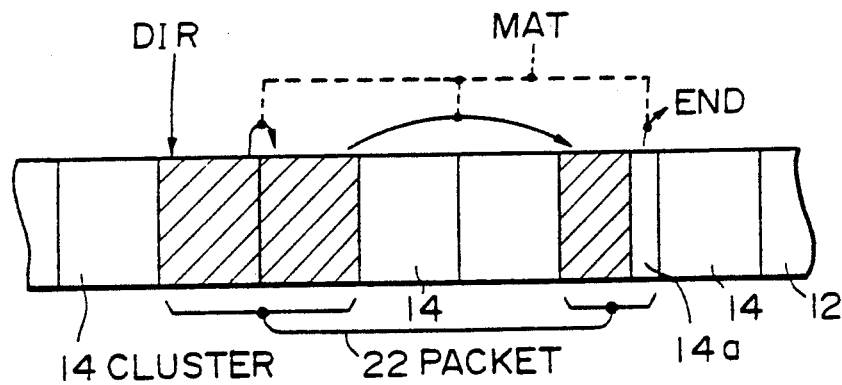
FIG. 9
| | |
|---|---|
| 0 0 0 0 | NON-USED OR ERASED |
| ✱ F F F | END OF PACKET |
| ✱ 0 0 1 | SUCCESSING CLUSTER NOS. |
| ✱ 3 F F | |
✱ : 0   WRITE PROTECT CANCELLED
✱ : F   WRITE PROTECT
FIG. 10
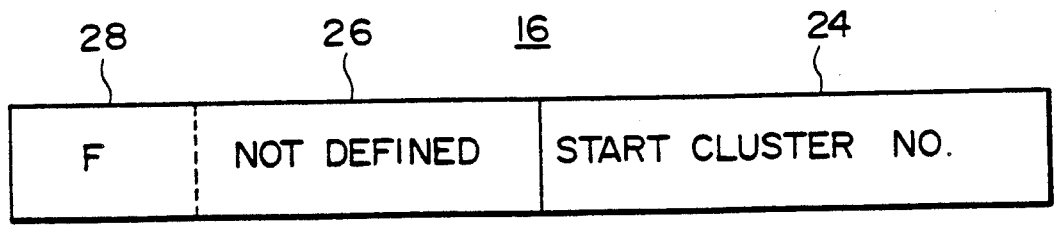

FIG. 8

| AREA | ADDRESS (HEXADECIMAL) | NUMBER OF BYTES | CONTENT |
|---|---|---|---|
| HEADER | 000000 | 1 | CARD NO. |
| | 000001~0004 | 4 | KIND OF MEMORY |
| | 000005~0006 | 2 | NUMBER OF REMAINING CLUSTERS |
| | 000007~0008 | 2 | NUMBER OF PACKETS TO BE USED |
| | 000009~03FF | 1015 | USER AREA |
| PACKET DATA AREA | 000400 | 1 | CONTENT OF PACKET 1 |
| | 000401 | 1 | CONTENT OF PACKET 2 |
| | ⌇ | ⌇ | ⌇ |
| | 0007FE | 1 | CONTENT OF PACKET 1023 |
| | 0007FF | 1 | DUMMY AREA |
| DIRECTORY | 000800~0801 | 2 | PACKET 1 START CLUSTER |
| | 000802~0803 | 2 | PACKET 2 START CLUSTER |
| | ⌇ | ⌇ | ⌇ |
| | 000FFC~0FFD | 2 | PACKET 1023 START CLUSTER |
| | 000FFE~0FFF | 2 | DUMMY AREA |
| MAT | 001000~1001 | 2 | CLUSTER 1 MAT |
| | 001002~1003 | 2 | CLUSTER 2 MAT |
| | ⌇ | ⌇ | ⌇ |
| | 0017FC~17FD | 2 | CLUSTER 1023 MAT |
| | 0017FE~17FF | 2 | DUMMY AREA |
| | 001800~1FFF | 2048 | SPARE |
| DATA | 002000~ | | PICTURE DATA (INCLUDING HEADER DATA) |

FIG. 11A

DIR

| PACKET NO. | LEADING CLUSTER NO. | | |
|---|---|---|---|
| 1 | 1 | 1 | 1 |
| 2 | 4 ⇒ | 7 ⇒ | 7 |
| 3 | 7 | 7 | 4 |

FIG. 11B

MAT

| CLUSTER NO. | MAT VALUE (HEXADECIMAL) | | |
|---|---|---|---|
| 1 | F 0 0 2 | F 0 0 2 | F 0 0 2 |
| 2 | F 0 0 3 | F 0 0 3 | F 0 0 3 |
| 3 | F F F F | F F F F | F F F F |
| 4 | 0 0 0 5 | 0 0 0 0 | F 0 0 5 |
| 5 | 0 0 0 6 | 0 0 0 0 | F 0 0 6 |
| 6 | 0 F F F | 0 0 0 0 | F 0 0 A |
| 7 | F 0 0 8 | F 0 0 8 | F 0 0 8 |
| 8 | F 0 0 9 | F 0 0 9 | F 0 0 9 |
| 9 | F F F F | F F F F | F F F F |
| 10 | 0 0 0 0 | 0 0 0 0 | F 0 0 B |
| 11 | 0 0 0 0 | 0 0 0 0 | F 0 0 C |
| 12 | 0 0 0 0 | 0 0 0 0 | F F F F |

FIG. 11C

PICTURE DATA

| CLUSTER NO. | | | |
|---|---|---|---|
| 1 | PACKET 1 | PACKET 1 | PACKET 1 |
| 2 | | | |
| 3 | | | |
| 4 | PACKET 2 | ⌐ ─ ┐ 30 | PACKET 3 |
| 5 | | | |
| 6 | | └ ─ ┘ | |
| 7 | PACKET 3 | PACKET 2 | PACKET 2 |
| 8 | | | |
| 9 | | | |
| 10 | | | PACKET 3 |
| 11 | | | |
| 12 | | | |

PICTURE DATA COMPRESSING AND RECORDING APPARATUS FOR RECORDING COMPONENTS OF THE PICTURE INDEPENDENTLY

BACKGROUND OF THE INVENTION

1. Field of the Invention

The present invention relates to an apparatus for recording picture data on a recording medium by compressing the picture data, and more particularly, to a picture data compressing and recording apparatus for recording picture data on a recording medium by applying orthogonal transform coding to the picture data.

2. Description of the Prior Art

Digital picture data such as those produced by a digital electronic still camera are written into a memory while being subjected to any of a variety of compression coding techniques in order to reduce the amount of data and therefore, to reduce the required capacity of the memory. Two-dimensional orthogonal transform coding, in particular, is extensively used because it is capable of coding picture data by a large compression ratio and allowing a minimum of distortions ascribable to coding to occur in a picture.

Specifically, in two-dimensional orthogonal coding, picture data are divided into a predetermined number of blocks, and the picture data in the individual blocks are transformed independently of each other. The transformed picture data, i.e., transform coefficients, are compared with a certain threshold value so as to discard those coefficients which are smaller than the threshold value. The transform coefficients smaller than the threshold value are treated as (logical) ZEROs thereafter. The transform coefficients other than the discarded coefficients are divided by a predetermined quantizing step size, i.e., a normalizing coefficient, thereby, quantizing or normalizing a step size basis. This is successful in suppressing the value of the transform coefficient, i.e., the dynamic range of the amplitude.

The compressed data that have undergone orthogonal transformation as stated above are made up of a portion where the frequency component is lowest, i.e., a so-called DC component and the other portion or AC component. The two components are coded by Huffman coding or similar coding technology to become further compressed data.

Orthogonal transform coding features a large compression ratio, as discussed above. With such a coding principle, however, it is impracticable to display a picture directly by reproducing the compressed data. Specifically, decoding and orthogonal inverse transformation have to be applied to the compressed data at the time of reproduction, resulting in the need for a prohibitive amount of arithmetic operations. Hence, reproducing a picture represented by compression coded data by decoding the data is undesirable when one desires to see a picture picked up by an electronic still camera, for example, immediately as a simplified picture on a viewfinder.

SUMMARY OF THE INVENTION

It is therefore an object of the present invention to provide a picture data compressing and recording apparatus which records picture data that have undergone orthogonal transform coding in a recording medium in such a manner as to allow the picture data to be reproduced in the form of a simplified picture.

In accordance with the present invention, a data compressing and recording apparatus for dividing digital picture data which constitute a single picture into a plurality of blocks, applying two-dimensional orthogonal transform coding to the picture data of the individual blocks, and recording the coded picture data in a recording medium includes an orthogonal transforming section which applies two-dimensional orthogonal transformation to the plurality of blocks of digital picture data. A normalizing section normalizes at least AC components of the data transformed by the orthogonal transforming section. Coding means codes, among the data transformed by the orthogonal transmforming section and the data normalized by the normalizing section, at least the normalized data. A control section controls the order in which the DC component data and the AC component data individually transformed by the orthogonal transforming section are to be normalized and coded. The control section records, by controlling the order of normalizing and coding of the DC component data and the AC component data, the transformed DC component data and the transformed AC component data in the recording medium collectively on a picture basis.

BRIEF DESCRIPTION OF THE DRAWINGS

The objects and features of the present invention will become more apparent from the consideration of the following detailed description taken in conjunction with the accompanying drawings in which:

FIG. 2 shows a specific assignment of transform coefficients applicable to the embodiment of FIG. 1;

FIG. 7 is a diagram schematically showing a system for supervising the storage associated with a memory cartridge;

FIGS. 8, 9, 10, 11A, 11B and 11C illustrate the storage supervising system specifically;

DESCRIPTION OF THE PREFERRED EMBODIMENTS

Figure 1:
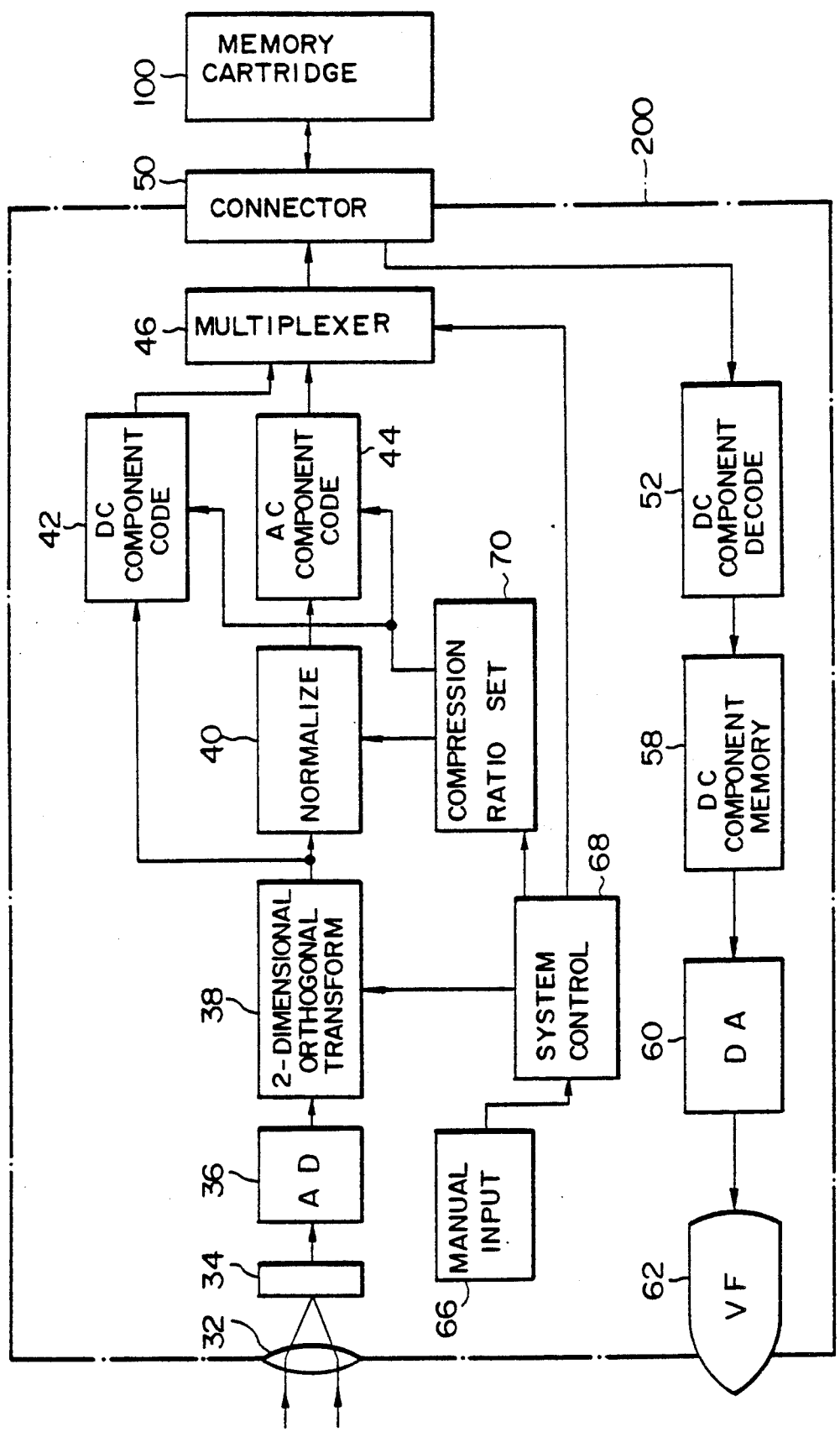
FIG. 1 is a schematic block diagram showing a picture data compressing and recording apparatus embodying the present invention.

Referring to FIG. 1 of the drawings, a picture data compressing and recording apparatus embodying the present invention is shown which is utilized in a digital electronic still camera by way of example. The electronic still camera, generally 200, has a lens 32 and an imaging device 34. A scene picked up by the imaging device 34 through the lens 32 is recorded in a memory cartridge 100 in the form of picture data.

The memory cartridge 100 is detachably connected to the camera 200 by a connector 50. The memory cartridge 100 has a semiconductor memory built therein and is representative of a memory card, IC (Integrated Circuit) card or similar storage. The connector 50 sets up electrical connection between the memory cartridge 200 and camera 200 and includes terminals provided on the cartridge 100 and terminals provided on the camera 200. The memory cartridge 100 has a memory for storing compressed digital picture data which are fed thereto from the camera 200, as described in detail later.

The output signal of the imaging device 34 is applied to a signal processor, not shown, to undergo color adjustment and other various kinds of signal processing. The processed signal is fed to an analog-to-digital (AD) converter 36 and transformed into digital data representative of the scene picked up. The digital data are subjected to color separation and converted into a matrix by a processing circuit, not shown, and then divided into a plurality of blocks by a dividing section, not shown. Such blocks of picture data are delivered from the dividing section to a two-dimensional orthogonal transforming section 38. In response, the orthogonal transforming section 38 transforms the picture data block by block by the two-dimensional orthogonal transform principle. This transformation be implemented by discrete cosine transformation (DCT), Hadamard transformation or similar transforming technology known in the art.

Figure 2:
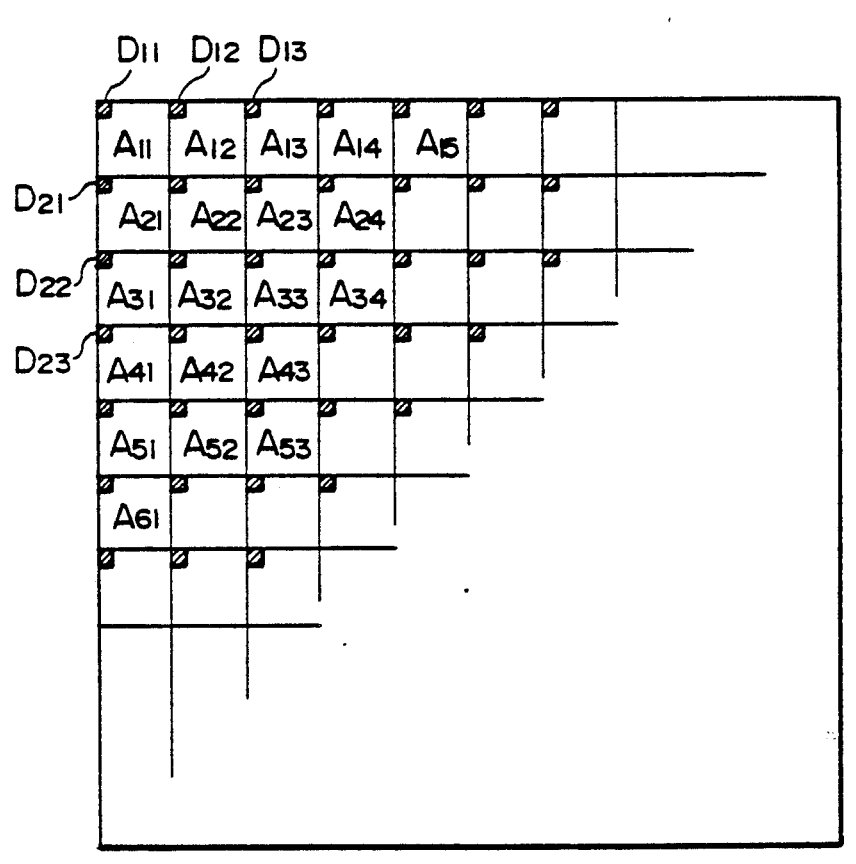

The orthogonal transform processing will be outlined hereinafter. One field of original picture data is constituted by N×M pixels, while one pixel is represented by 8-bit data, for example. Such original picture data are divided into a plurality of blocks in each of the vertical and horizontal directions of a field. One block may have 8×8 pixels, for example. The original picture data are subjected to DCT block by block so as to determine transform coefficients, or DCT coefficients, of the individual blocks. As shown in FIG. 2, the transform coefficients are made up of those components of the individual blocks which have the lowest frequency, i.e., DC component data D11, D12, D13 and so forth, and AC component data A11, A12, A13 and so forth. The DC component data are each representative of an average luminance of the associated block.

The AC component data of the transform coefficients are fed to a normalizing section 40. In response, the normalizing section 40 performs coefficient discarding operations with the transformed picture data, i.e., the AC components of the transform coefficients. Specifically, the normalizing section 40 compares the individual transform coefficients that have undergone orthogonal transformation with a predetermined threshold value and discards those coefficients which are smaller than the threshold value. Also, the normalizing section 40 divides the transform coefficients that have undergone the coefficient discarding operation by a predetermined quantizing step size, i.e., a normalizing coefficient so as to quantize them. Usually, the coefficient discarding operation and the quantizing operation are executed at the same time.

Figure 12:
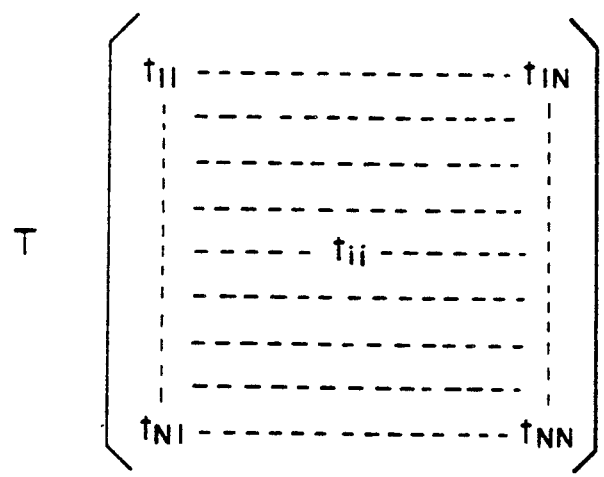
FIG. 12 shows an example of a weight table data.

A compression ratio setting section 70 sets up a particular normalizing coefficient. For example, the normalizing coefficient is selected on the basis of a value which is produced by determining the activity of each block, i.e., the proportion of a high frequency component and then summing up such proportions throughout the picture. The use of a single normalizing coefficient as stated above is not limitative and only illustrative. For example, table data shown in FIG. 12 may be used in order to effect the normalization by using the products of the table data and the normalizing coefficient.

Figure 13:
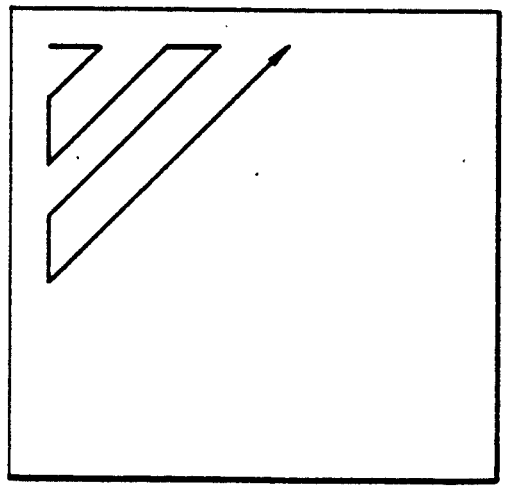
FIG. 13 shows a sequence of coding run-lengths and non-ZERO amplitudes.

The normalized transform coefficients, like the pixel data, are arranged in blocks. As shown in FIG. 13, the blocks of normalized transform coefficients are outputted by being scanned in a zigzag fashion.

The AC components from the normalizing section 40 are applied to an AC component coding section 44. Considering the fact that a (logical) ZERO often appears continuously in the normalized transform coefficients which have been scanned in a zigzag fashion as stated above, the AC component coding section 44 detects the amounts of continuous ZEROs, i.e., the run-lengths of ZEROs as well as the amplitudes of non-ZEROs. The ZERO run-lengths and non-ZERO amplitudes are subjected to two-dimensional Huffman coding. The output of the AC component coding section 44 is fed to a multiplexer 46. On the other hand, the DC components from the orthogonal transforming section 38 are routed to a DC component coding section 42. This section 42 Huffman-codes the DC components of the transform coefficients and feeds the resulting codes to the multiplexer 46.

The multiplexer 46 selects either the coded data from the DC component coding section 42 or those from the AC component coding section 44 in response to a control signal which is fed thereto from a system control section 68. The selected data are fed out to the memory cartridge 100 via the connector 50.

The system control section 68 governs the shooting operations of the camera 200, orthogonal transformation of data, coding, writing of compressed picture data into the memory cartridge 100, and other similar processing. The system control section 68 includes a CPU (Central Processing Unit), a ROM (Read Only Memory) loaded with programs to be executed by the CPU, and a RAM (Random Access Memory) to be loaded with necessary data.

Figure 3:
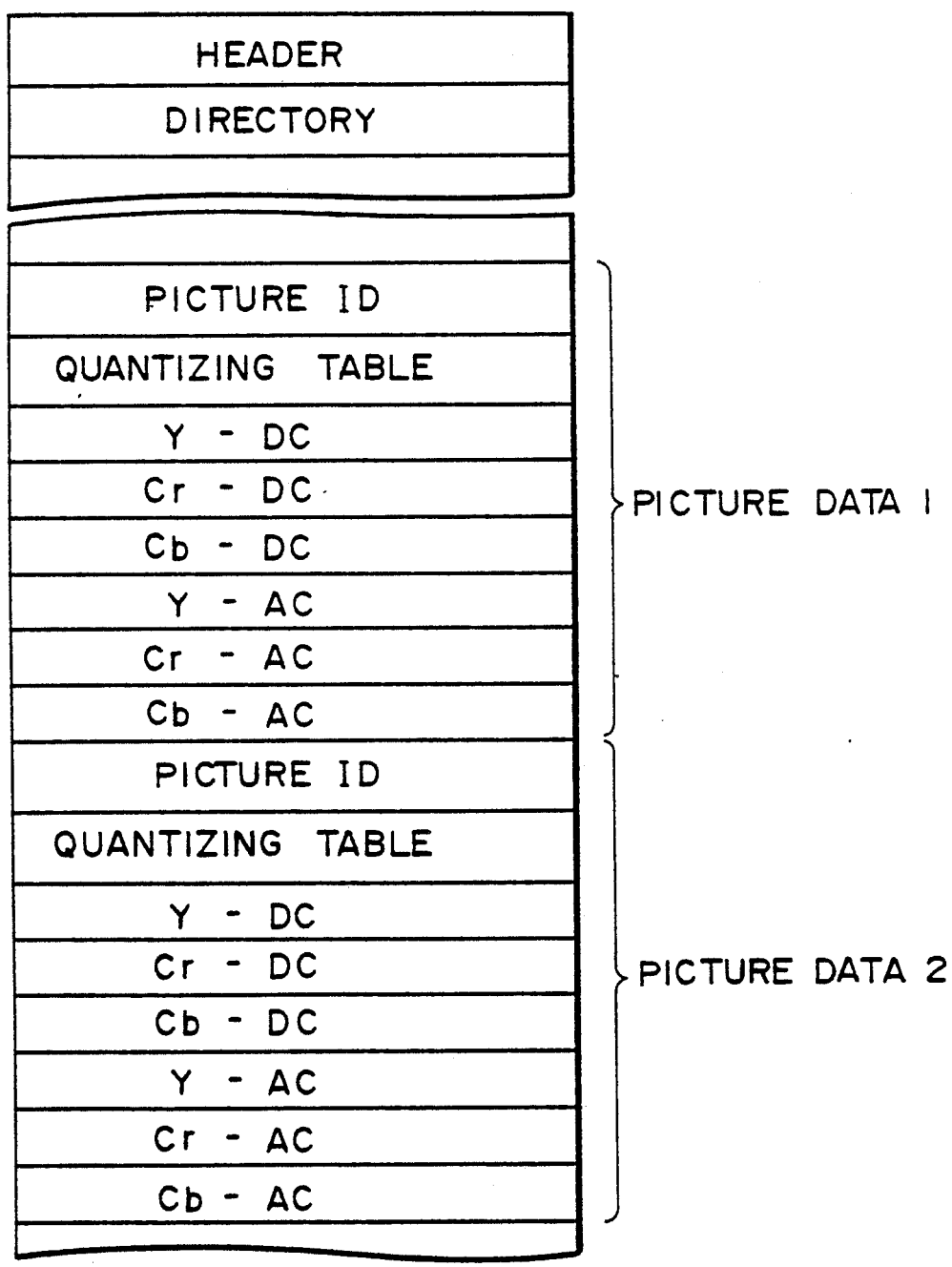
FIGS. 3 and 4 are memory maps each showing a different arrangement of data which are stored in a memory cartridge of FIG. 1.

As shown in FIG. 3, the memory cartridge 100 has a header area, a directory area, and picture data areas 1 and 2 and so forth in which header data, directory data and picture data may be recorded, respectively. The header data is representative of the number, capacity or similar data particular to the memory cartridge 100 which may be comprised of a memory card, for example. Concerning the directory data, the start addresses of data of pictures being stored in the individual picture data areas are stored. The picture data are constituted by compression-coded data representative of independent still pictures and which are fed from the camera 200 via the connector 50. Picture data associated with each picture are headed by picture identification (ID) data which is unique to the picture. Typical of such picture ID data are the number assigned to the still picture, data of shot, picture quality mode, black-and-white/color, etc. The picture ID data are followed by a quantizing table which lists various data used for compression coding, e.g., a normalizing coefficient used for normalization.

In each of the picture data areas 1 and 2 and so forth, the quantizing table is followed by compression-coded picture data. The picture data areas 1 and 2 and so forth shown in FIG. 3 are assumed to store color picture data by way of example. In each picture data area, a DC component Y−DC of a luminance signal Y, a DC component Cr−DC of a chrominance signal R−Y, a DC component Cb−DC of a chrominance signal B−Y, an AC component of the luminance signal Y, an AC component Cr−AC of the chrominance signal R−Y, and an AC component Cb−AC of the chrominance signal B−Y are sequentially recorded in this order.

Referring again to FIG. 1, the camera 200 further includes function blocks for reading picture data representative of a picture out of the memory cartridge 100 and displaying then on a viewfinder (VF) 62 in the form of a simplified picture. Specifically, a DC component decoding section 52 decodes the DC components of picture data which are read out of the memory cartridge 100 via the connector 50. The decoded DC components are once stored in a DC component memory 58 and then converted into an analog signal by a digital-to-analog (DA) converter 60. The resulting analog signal is fed to the viewfinder 62 so as to be displayed thereon as a simplified picture.

The apparatus having the above construction will be operated as follows. As the camera 200 picks up a color still picture representative of a desired scene by the imaging device 34 through the lens 32, its output signal is processed by the signal processing circuit, not shown, for color adjustment and other various kinds of processing. The processed signal is converted into digital data by the AD converter 30. The digital data are subjected to color separation and matrix processing by the color separation and matrix circuit, not shown, to produce data representative of a luminance signal Y and chrominance signals R−Y and B−Y. These data Y, R−Y and B−Y are individually divided into blocks and then temporarily stored in a block data memory, not shown. The data blocks are fed to the two-dimensional orthogonal transforiming section section 38 to undergo two-dimensional orthogonal transformation.

Subsequently, the DC component Y−DC of the luminance signal Y is applied to the DC component coding section 42. The coded DC component Y−DC from the coding section 42 is written into the picture data area of the memory cartridge 100 via the multiplexer 46 and connector 50. Then, the DC components Cr−DC and Cb−DC of the chrominance signals R−Y and B−Y, respectively, are written into the picture data area of the memory cartridge via the DC component coding section 42, multiplexer 46, and connector 50. Thereafter, the AC component Y−AC of the luminance signal Y is normalized by the normalizing section 40, coded by the AC component coding section 44, and then written into the picture data area of the memory cartridge 100 via the multiplexer 46 and connector 50. Further, the AC components Cr−AC and Cb−AC of the chrominance signals R−Y and B−Y, respectively, are sequentially written in this order into the memory cartridge 100 via the AC component coding section 44, multiplexer 46, and connector 50.

The quantizing tables multiplied by the normalizing coefficient which is set up by the compression ratio setting section 70 are written into the picture data area of the memory cartridge 100 via the connector 50 before and after the recording of picture data. Data particular to the picture such as the date of shot and picture quality mode are entered on a manual inputting section 66 and written into the picture data area of the memory cartridge 100 via the multiplexer 46 and connector 50. The system control section 68 records in the directory area of the memory cartridge 100 the start address of the picture data area into which the picture data have been written.

By the same procedure as described above, picture data representative of the next color picture are compressed and then written into the picture data area of the memory cartridge 100, while the start address of those picture data is also recorded in the directory area. In this manner, a plurality of picture data 1 and 2 and so forth are loaded into the memory cartridge 100, as shown in FIG. 3.

The picture data written into the memory cartridge 100 are reproduced in the form of a simplified picture on the viewfinder 62, as follows. Among the picture data stored in the memory cartridge 100, the data representative of the DC component Y−DC of the luminance signal Y and the data representative of DC components Cr−DC and Cb−DC of the chrominance signals R−Y and B−Y, respectively, are sequentially read out in this order via the connector 50. These data are decoded by the DC component decoding section 52 and stored in the DC component memory 58. The DC component data stored in the memory 58 are sequentially read thereout, converted into an analog signal, and then displayed on the veiwfinder 62 as a simplified picture in a reduced scale. Implemented as a liquid crystal display, for example, the viewfinder 62 displays a simplified picture based on the DC component data and, therefore, needs only a relatively small number of pixels.

The DC components are representative of average luminances of the individual blocks. Hence, even a picture constituted by DC components alone will be sufficient for one to see the rough pattern of the entire field. In this manner, a simplified version of a picture stored in the memory cartridge 100 appears on the viewfinder 62. This allows the layout and outline of a picture, for example, to be displayed with ease on the viewfinder 62. Such a display will also help one erase picture data stored in the memory cartridge 100.

As described above, a simplified color picture is displayed on the viewfinder 62 by reading the DC component Y−DC of the luminance signal Y, the DC component Cr−DC of the chrominance signal, and the DC component Cb−DC of the chrominance signal B−Y out of the memory cartridge 100. On the other hand, a simplified black-and-white picture will be displayed on the viewfinder 62 when only the DC component Y−DC of the luminance signal Y is read out of the memory cartridge 100. The address control in the event of the read-out of the DC component Y−DC of the luminance signal Y is easy because the DC component Y−DC is recorded at the head of the picture data.

In the illustrative embodiment, the DC component Y−DC of the luminance signal Y and the DC components Cr−DC and Cb−DC of the chrominance signals R−Y and B−Y, respectively, are recorded in this sequence in the memory cartridge 100, and then the AC components are recorded, as stated earlier. The DC component data recorded in the memory cartridge 100 collectively can be readily read out alone. Heretofore, DC components and AC components have been recorded alternately in a memory, complicating the read-out addresses.

Further, since the illustrative embodiment records the DC components before the AC components, the DC component data can be readily read out of the memory cartridge 100 and displayed as a simplified picture by using the start address of the picture which is stored in the directory area. If desired, each ID data and its associated quantizing table may be recorded in the picture data area after the AC components. This will allow the addresses of the DC component data to be designated directly on the basis of the start address of the associated picture which is recorded in the directory area, thereby further promoting easy read-out of the DC component data.

In this embodiment, since the DC components associated with the luminance signal Y and chrominance signals R−Y and B−Y are stored in the memory cartridge 100 independently of each other, the picture data can be read out with ease. This is especially true when it is desired to display a picture by using the DC component Y−DC of the luminance signal Y only.

Figure 4:
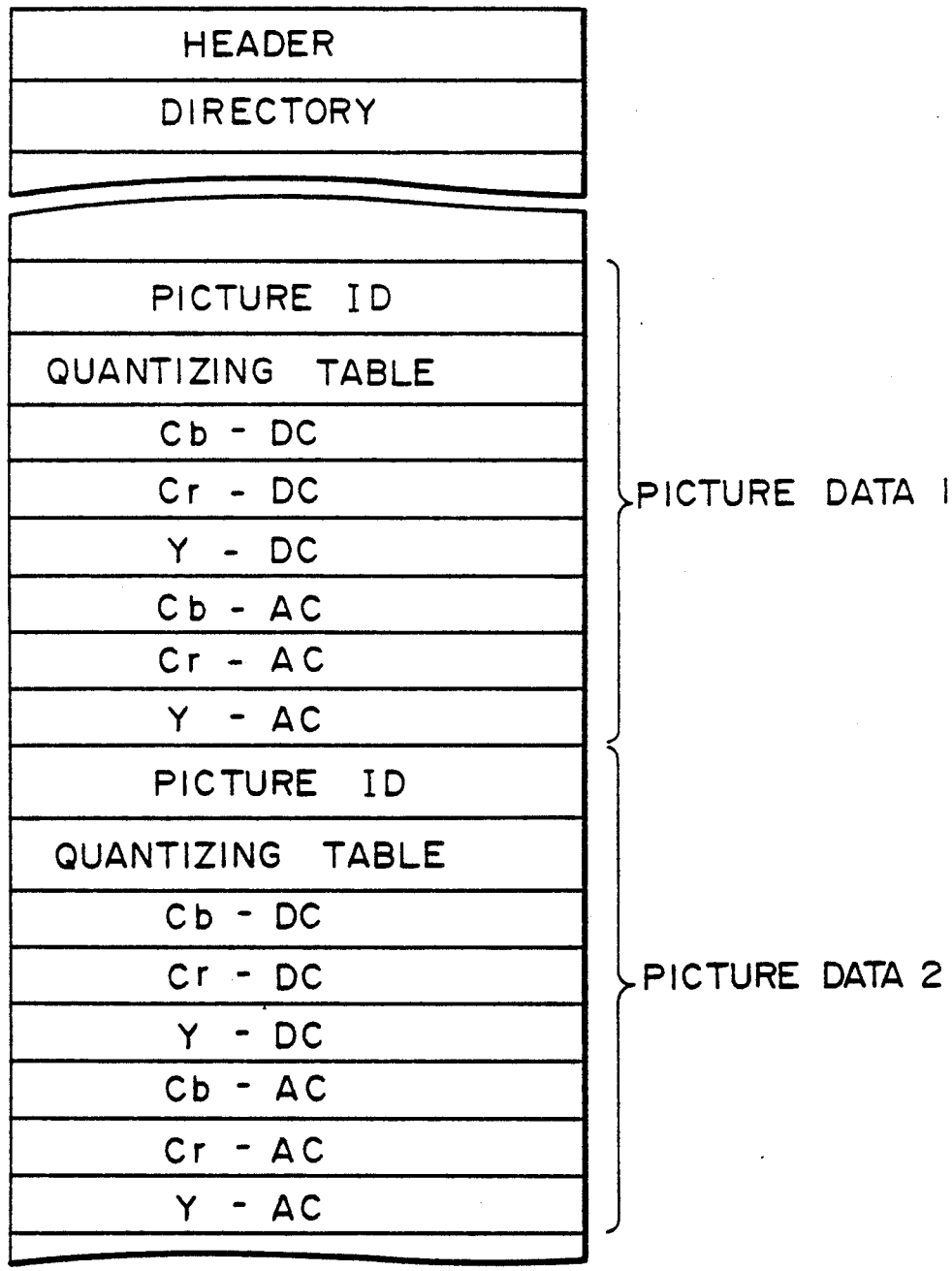

Referring to FIG. 4, data stored in the memory cartridge 100 and representative of an alternative embodiment of the present invention is shown. While picture data are shown in FIG. 4 as being recorded in the memory cartridge 100 in a different sequence from the picture data of FIG. 3, they may also be produced by the circuitry shown in FIG. 1.

In the alternative embodiment, the DC components of the data associated with the luminance signal Y and chrominance signals R−Y and B−Y and divided into blocks are loaded into the memory cartridge 100 in the order of the DC component Cb−DC of the chrominace signal B−Y, DC component Cr−DC of the chrominance signal R−Y, and DC component Y−DC of the luminance signal Y. Likewise, the AC components are recorded in the order of the AC component Cb−AC of the chrominance signal B−Y, AC component Cr−AC of the chrominance signal R−Y, and AC component Y−AC of the luminance signal Y. For any of the DC and AC components, therefore, the chrominance signals B−Y and R−Y and the luminance signal Y are recorded in this order.

Each of the DC component coding section 42 and AC component coding section 44 is constructed so as to stop outputting any futher coded data of a particular data which is one bit short of an amount of data having bits the number of which is determined in association with the compression ratio. More specifically, each of the coding sections 42 and 44 does not output coded data which follow that particular data, i.e., it discards the subsequent data. Hence, the remaining bits resulted from the coding of the chrominance signal B−Y, i.e., a difference between the predetermined number of bits and the number of bits of the coded data actually outputted by coding is allocated to the coding of the chrominance signal R−Y. Likewise, the remaining bits resulted from the coding of the chrominance signal R−Y are allocated to the coding of the luminance signal Y. Allocating such a number of bits to the data associated with the luminance signal Y and chrominance signal R−Y is successful in providing a decoded picture with high quality, because the signals Y and R−Y have decisive influence as to the sense of sight. Moreover, since the data associated with the luminance signal Y are increased in amount, relatively high picture quality is achievable even when a simplified picture is implemented by the luminance signal Y only.

In this embodiment, the start addresses of individual pictures are also recorded in the memory cartridge 100 in the form of directory data to facilitate the read-out of picture data. Again, the DC component data are recorded before the AC component data, allowing a simplified picture to be displayed by the DC component data only. If desired, the memory cartridge 100 may be loaded with memory allocation table (MAT) data in addition to the directory data so as to allow any of the various signal components to be designated by their addresses. Then, it is possible to read only the DC component Y−DC of the luminance signal Y out of the memory cartridge 100, and therefore, a simplified picture can be displayed by using the DC component Y−DC.

In any of the embodiments shown and described, the DC components of the transform coefficients which have undergone two-dimensional orthogonal transformation are coded by the DC component coding section 42 and then recorded in the memory cartridge 100. Alternatively, the DC components may be directly written into the memory cartridge 100 without being coded, in which case the DC component coding and decoding sections 42 and 52 will be needless.

The DC components of the transform coefficients may be normalized and coded together with the AC components. Then, the DC component coding section 42 will play the role of the AC component coding section 44 also. Further, the DC component data may be displayed on the viewfinder 62 after interpolation. The interpolation will allow the picture to be displayed even on a display having pixels the number of which is greater than that of the pixels of the DC components, with a smoother contour.

A system will be described below for supervising the recording of the data in the memory cartridge 100.

Referring to FIG. 7, in which the supervising system is shown schematically, the memory cartridge 100 has a storage area 12 which is divided into clusters 14 each having a predetermined capacity. A MAT (Memory Allocation Table) 18 is used in addition to a directory (DIR) 16 (FIG. 5) for supervising the clusters 14. The other part of the storage area 12 serves as a picture data field 20 for storing picture data. While the capacity of each cluster 14 is open to choice, a capacity accommodating only a positive integral fraction of data which is necessary to render a single picture by a picture signal of standard format, for example, may be selected. In the following description, the data necessary to render a single picture by such a picture signal will be referred to as a packet for convenience.

Basically, in the illustrative embodiment, one packet of picture data 22 is stored in any of the clusters 14. The MAT field 18 is loaded with data associated the clusters 14 storing one packet of picture data 22, i.e., MAT data. The MAT data may include, when a certain cluster 14 storing a part of one packet of picture data 22 is observed, the numbers or similar ID data representative of the other clusters 14 storing, among the remaining picture data, picture data which are directly linked with the former. When no remaining picture data are present, that the packet 22 terminates at the above-mentioned particular cluster 14 which is indicated by a predetermined code such as "ALL ONEs" (binary value). The directory field 16 is loaded with ID data representative of a particular cluster 14 which stores the leading data of a sequence of picture data, on a picture or packet basis. This ID data may be implemented as a start cluster number 24 (FIG. 10). The directory field 16, therefore, shows those clusters 14 which are loaded with picture data representative of a single picture.

Assuming that the memory cartridge 100 has a capacity of 64 megabits, for example, it may be divided into 1024 clusters 14 each having a capacity of 64 kilobits. Numbers 0 to 1023 are assigned to such clusters 14 according to the order of physical arrangement. A cluster No. 0 is loaded with supervisory data. In this particular embodiment, the supervisory data include a header, packet data, a directory, and a MAT, as shown in FIG. 8. These data are stored in the individual locations of the cluster No. 0. The other clusters, i.e., clusters Nos. 1 to 1023 are loaded with picture data. The picture data also include header data and quanitizing tables which are particular to the individual pictures.

One packet 22 is stored in one or more clusters 14, as the case may be. In this regard, the packet may be termed as a logical area which is loaded with picture data representative of a single picture. Numbers are assigned to the consecutive packets 22 according to the order in which the picture data were inputted, or any other practical order. When a certain packet 22 is erased, the numbers subsequent to the number of that packet 22 are sequentially shifted by 1 (one) toward the lowest number. One packet of picture data 22 is stored in one or a plurality of clusters 14. The last cluster 14 of a packet 22 may have an empty region 14a, as shown in FIG. 7. The number of packets 22 which can be stored in the memory cartridge 100 is equal to the number of the clusters 14 defined in the cartridge 100 minus 1.

In the illustrative embodiment, the directory field 16 has two bytes for each packet 22 and stores the leading cluster 14 of each packet 22. In this embodiment, since the number of clusters 14 is assumed to be 1024, ten bits are assigned to the start cluster number while the other bits are empty bits 26 as shown in FIG. 10. The MAT field 18 has two bytes for each cluster and stores the numbers assigned to the subsequent clusters 14. The values of the MAT 18 are defined as shown in FIG. 9 by way of example. In the illustrative embodiment, the most significant bit (MSB) (hexadecimal) is adapted for a write protect indication. When the MSB is "ONE", the write-in and read-out of data associated with that cluster 14 is allowed; when it is "ALL ONEs" or hexadecimal "F", the write-in or read-out is inhibited. The other three bits of the MAT 18 assume "ALL ZEROs" when the cluster 14 is empty, e.g., when the cluster 14 has not been used or it has been erased. It assumes "ALL ONEs" or hexadecimal "FFF" when the cluster 14 is located at the end of the packet 22. If any other clusters 14 are to follow in the same packet 22, the remaining three bits will assume the numbers assigned to those clusters 14.

In this particular embodiment, the write protect is supervised cluster by cluster, i.e., on the basis of a physical area to be designated by an address. Alternatively, as shown in FIG. 10, a write protect indication may be provided in the directory field 16. Then, the write protect will be supervised on a packet basis because the directory 16 itself is association with a packet. Specifically, in the example shown in FIG. 10, hexadecimal "F" is indicated in a part of the empty region 26 such as on the MSB 28 so as to implement the inhibition of the write-in and read-out associated with the cluster of interest.

Assume that packet Nos. 1, 2 and 3 each having picture data which need three clusters to be stored are stored in a cluster No. 1 and successive clusters, a cluster No. 4 and successive clusters, and a cluster No. 7 and successive clusters, respectively. Then, the directory 16 will store therein the data which are shown in the leftmost column of FIG. 11A, while the MAT 18 will have the values representative of the leading cluster numbers and successive cluster numbers with respect to the individual packet Nos. 1, 2 and 3 as shown in the leftmost column of FIG. 11B. In this instance, the picture data area 20 of the memory cartridge 100 are loaded with picture data as shown in the leftmost column of FIG. 11C.

In this example, the write protect indication is selected to be "ZERO" for, among the packet Nos. 1, 2 and 3, the packet No. 2. Hence, when the packet No. 2 is erased, the directory 16 changes the leading cluster number of the packet No. 2 to "7", as shown in the intermediate column of FIG. 11A. In response, the MAT 18 erases the MAT data associated with the cluster Nos. 4, 5 and 6, as shown in the intermediate column of FIG. 11B. It is to be noted that the cluster Nos. 4, 5 and 6 of the picture data area 20 may not be actually erased so long as the magnetic storage is concerned, i.e., it may be left as indicated by a dotted line 30 at the center of FIG. 11C.

Subsequently, a new packet No. 3 is recorded. In this example, the packet No. 3 is assumed to be high-quality picture data and need six clusters to be stored. Then, as shown in the rightmost column of FIG. 11A, the leading cluster number of the packet No. 3 becomes "4" in the directory 16. In response, as shown in the rightmost column of FIG. 11B, the MAT 18 forms MAT data representative of six clusters, i.e., cluster Nos. 4, 5, 6, 10, 11 and 12. As a result, as shown in the rightmost column of FIG. 11C, picture data of the packet No. 3 are stored in the cluster Nos. 4, 5, 6, 10, 11 and 12 of the picture data area 20. In the cluster Nos. 4, 5 and 6, new data are written over the old data. In this example, "F" is indicated on the write protect bit.

Figure 5:
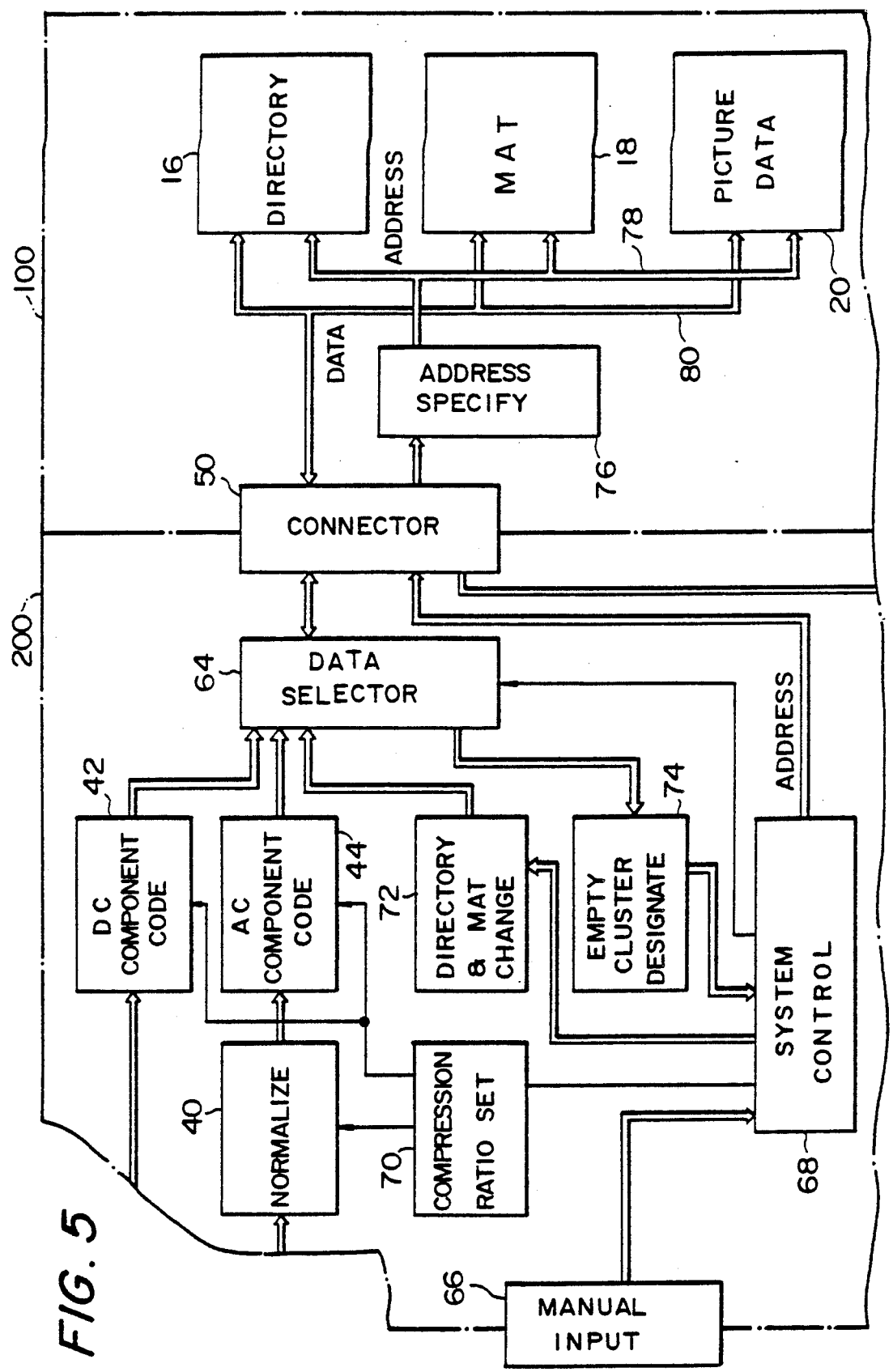
FIGS. 5 and 6 are partial schematic diagrams showing an alternative embodiment of the present invention which adopts a record supervising system.
Figure 6:
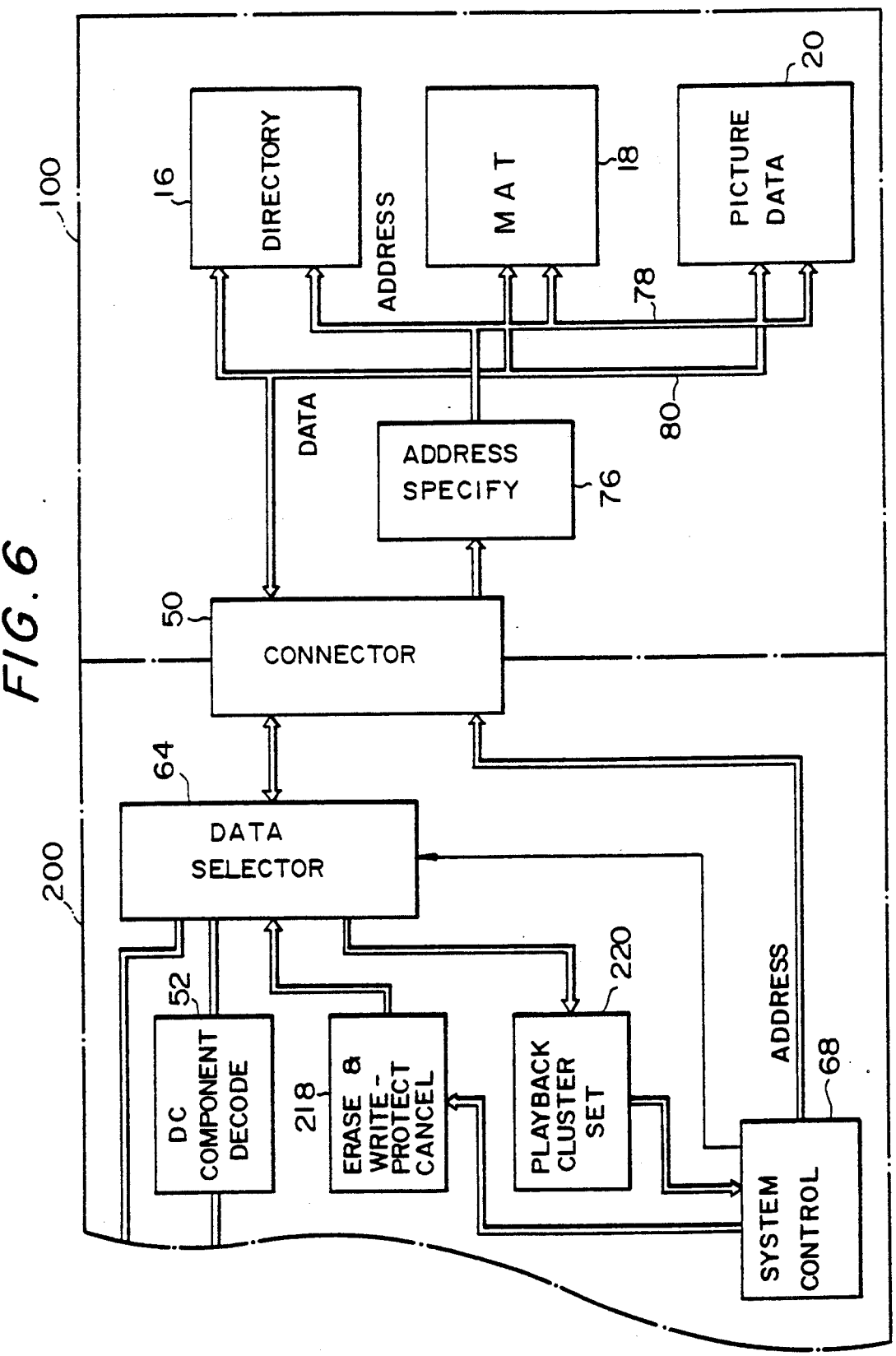

Referring to FIGS. 5 and 6, an alternative embodiment of the present invention is shown in which the storage supervising system described above is applied to the electronic still camera of FIG. 1. In FIGS. 5 and 6, a part of the same function blocks as those shown in FIG. 1 are omitted for simplicity. As shown, the camera 200 has the manual inputting section 66 which is accessible for entering various kinds of commands such as an expose command, a data compression mode command and a write protect command. These commands are applied to the system control section 68.

A data selector 64 includes the multiplexer 46 shown in FIG. 1 and selectively delivers compressed picture data from the DC component and AC component coding sections 42 and 44, respectively, and control data associated with the system control section 68 to the memory cartridge 100 via the connector 50. Connected to the data selector 64 is a directory and MAT changing circuit 72 and an empty cluster designating circuit 74. The directory and MAT changing circuit 72 generates data to be written into the directory 16 and MAT 18 of the memory cartridge 100. The empty cluster designating circuit 74 monitors the clusters 14 of the memory cartridge 100 which store picture data, to see if they are empty or full. More specifically, this circuit 74 searches the MAT 18 and reports specific empty clusters to the system control circuit 74.

On the other hand, the memory cartridge 100 has an address specifying circuit 76. An address designating a particular location of the memory cartridge 100 is fed from the system control section 68 to the address specifying circuit 76 via the connector 50. An address bus 78 and a data bus 80 are built in the memory cartridge 100 and are connected to the storage areas 16, 18 and 20. The address bus 78 and data bus 80 are connected to the address designating circuit 76 and connector 50, respectively.

In the digital electronic still camera 200 having the above construction, the previously stated system for supervising the memory cartridge 100 is implemented by the following sequence of steps.

After the memory cartridge 100 has been mounted on the camera 200 through the connector 50, the manual inputting section 66 is operated to enter a particular picture data compression mode. In response, the system control section 68 causes the compression ratio setting section 70 to set up a compression ratio associated with the entered compression mode. Based on the amount of data which will appear after compression, the system control section 68 calculates the number of clusters, A, necessary to store the data in the picture data area of the memory cartridge 100, and then it causes the empty cluster designating circuit 74 to search the MAT 18. On finding empty clusters on the MAT 18, the empty cluster designating circuit 74 reports the numbers assigned to the empty clusters to the system control section 68. Then, the system control section 68 compares the number of empty clusters, B, with the number of necessary clusters, A, and if the former is greater than the latter, designates the empty clusters 14, the lowest number being the first.

As soon as a shoot command is entered on the manual inputting section 66, the system control section 68 drives the imaging device 36 to pick up a scene. The resulting output of the imaging device 36 is converted into digital data by the AD converter 36 and then subjected to orthogonal transformation at the two-dimensional orthogoral transforming section 38. DC components from the transforming section 38 are coded by the DC component coding section 42, while AC components are normalized by the normalizing section 40 and then coded by the AC component coding section 44. The coded DC and AC component data are individually compressed in the previously stated sequence. The system control section 68 generates addresses of the picture data area 20 on the basis of the numbers assigned to the designated clusters 14. These addresses and data are delivered to the memory cartridge 100 via the connector 50.

In response to the designated addresses, the memory cartridge 100 writes directory data into the directory 16, MAT data into the MAT 18, and picture data into the picture data area 20. At this instant, a directory S-DIR of a packet to be sacrificed as will be described is erased, and a new directory is registered instead. The directories are sequentially recorded while being shifted toward the lowest number. The MAT 18 is changed in association with the clusters 14 which have been loaded with picture data as stated above. During the change of the MAT 18, MATs individually associated with the remaining clusters 14 of the sacrificed packet 22 are provided with a value "0000".

On the other hand, if the necessary number of clusters A is greater than the number of empty clusters B, the system control section 68 reads the MAT 18 designated by the directory 16 which was registered earliest, to see if its MSB is "F". If it is "F", meaning that the erasure and write-in of that cluster have been inhibited, the system control section 68 searches all the directories 16 in order to find a MAT 18 without a write protect indication. If there is any directory 16 which the system control section 68 has not searched, the system control section 68 read a MAT designated by that directory and checks it for write protect also. If all the MATs 18 have a write protect indication, the system control section 68 determines that no location is available for storage (FULL), and, so, informs the operator of such a condition through the manual inputting section 66 visibly and/or audibly.

When the system control section 68 finds a MAT 18 without a write protect indication, it loads a register C with the number of clusters of a packet associated with the directory of the usable MAT 18 while loading a register S-DIR with the directory. The register S-DIR serves as a directory of the packet to be sacrificed. Then, the system control section 68 adds the number of clusters, C, to a register B which is adapted for the number of empty clusters and compares the sum with the necessary number of clusters, A. If the number of empty clusters, B, is greater than the necessary number of clusters, A, the program advances to the previously stated shooting operation. If otherwise, the system control section 68 again searches for empty clusters. The operation to follow is the same as the above-described procedure.

As shown in FIG. 10, when a write protect indication is incorporated in the directory 16 and not in the MAT 18, it can be identified before the read-out of the MAT 18. When the system control section 68 stores picture data, it reads the directory 16 in order to find usable clusters first. Hence, the system which incorporates the write protect indication in the directory 16 is successful in somewhat reducing the required number of system control steps. All that is required for the cancellation of a write protect indication is changing the directory 16 only.

The picture recorded in the memory cartridge 100 by the procedure described above may be displayed on the viewfinder 62 in the form of a simplified picture by a playback section. A specific construction of the playback section is shown in FIG. 6. In FIG. 6, the DC component decoding section 52 is connected to the connector 50 via the data selector 64, the connector 50 connecting to the memory cartridge 100. DC component data read out of the memory cartridge 100 via the connector 50 are displayed on the viewfinder 62 as in the circuitry of FIG. 1.

An erasing and write-protect cancelling circuit 218 and a playback cluster setting circuit 220 are connected to the system control section 68. The erasing and write-protect cancelling circuit 218 erases picture data stored in the memory cartridge 100 and cancels write protection. The playback cluster setting circuit 220 reads directories 16 and MATs 18 out of the memory cartridge 100 which is connected to the apparatus 200, thereby producing a cluster table.

The operations of the apparatus shown in FIG. 6 will be described as follows. The operator connects the memory cartridge 100 to the apparatus through the connector 50 and then operates the manual inputting section 66 to enter the number of a frame which is to be reproduced. In response, the system control section 68 reads the directory 16 and MAT 18 out of the memory cartridge 100. Based on the directory 16 and MAT 18 read out, the playback cluster setting circuit 220 prepares a table by listing clusters 14. By referencing the cluster table, the system control section 68 generates the addresses of the clusters 14 which store the DC components of the picture of the frame to be displayed, thereby reading the DC components of the picture data out of the picture data area 20. The picture data so read out by the system control section 68 are delivered to the apparatus via the connector 50, decoded, and then displayed on the viewfinder 62 as a simplified picture.

Assume that an erase command is entered on the manual inputting section 66 while a picture of a certain frame is reproduced on the viewfinder 62. Then, the system control section 68 checks the MAT 18 for write protection. If the write protect indication of the MAT 18 is "0", the system control section 68 causes the erasing and write-protect cancelling circuit 218 to erase the content of the directory 16 and sequentially shifts the succeeding directories toward the lowest number. Simultaneously, the MAT 18 designated by the directory 16 and the successive MATs are changed to "0000", whereby the picture data associated with the frame or packet of interest are made blank resulting in the display on the viewfinder 62 becoming blank.

On the other hand, when the system control section 68 detects a write protect indication "F" in the MAT 18 and if a write protect cancel mode has been set on the manual inputting section 66, the system control section 68 causes the erasing and write-protect cancelling circuit 218 to change the MSB of the MAT 18 to "0". If a write protect cancel mode has not been set on the manual inputting section 66, the system control section 68 designates the frame again.

As stated above, in this particular embodiment, the storage area of the memory cartridge 100 is divided into a plurality of clusters 14 while a write protect function is incorporated in the directory 16 or in the MAT 18. This allows the storage area to be supervised for three different conditions: a condition with write protection, a condition without write protection, i.e., a condition wherein write-in is allowed if an empty area is not available elsewhere, and an erased condition, i.e., a condition wherein, even if data have been written in the storage area, access thereto is not allowed in the aspect of memory supervision and is in effect handled as an empty area.

Briefly, the illustrative embodiment supervises the storage of picture data and associated data in a memory card on a unit storage basis and provides an indication as to whether or not to allow overwriting or erasing in a directory or a MAT. Hence, overwriting and erasing are managed on a cluster basis or a packet basis, for example, so that the stored contents are selectively protected on the basis of the individual unit storage.

In summary, it will be seen that the present invention provides a picture data compressing and recording apparatus which records DC components and AC components of compressed, or coded, picture data collectively and, yet, independently of each other in a recording medium. The apparatus, therefore, allows only the DC components to be read out with ease to display a simplified picture. Further, the read-out of data can be readily controlled because the addresses of the individual components of picture data are recorded in a directory.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data compressing and recording apparatus for dividing digital picture data which constitute a single picture into a plurality of blocks, applying a two-dimensional orthogonal transform coding to the picture data of individual blocks, and recording the coded picture data in a recording medium, said apparatus comprising:
   orthogonal transforming means for applying a two-dimensional orthogonal transformation to a plurality of blocks of digital picture data;
   said orthogonal transforming means individually transforming DC components and AC components of said digital picture data to produce transformed DC component data and transformed AC component data;
   normalizing means for normalizing at least said transformed AC component data of the data transformed by said orthogonal transforming means;
   coding means for coding, from among the data transformed by said orthogonal transforming means and the data normalized by said normalizing means, at least the normalized data; and
   control means for controlling said normalizing means and said coding means;
   said control means controlling an order of normalizing and coding of said transformed DC component data and said transformed AC component data of said digital picture data;
   said control means controlling a recording of the DC component data and the AC component data in the recording medium such that the DC component data is recorded prior to the AC component data.

2. A data compressing and recording apparatus for dividing digital picture data which constitute a single picture into a plurality of blocks, applying a two-dimensional orthogonal transform coding to the picture data of individual blocks, and recording the coded picture data in a recording medium, said apparatus comprising:
   orthogonal transforming means for applying a two-dimensional orthogonal transformation to a plurality of blocks of digital picture data;
   said orthogonal transforming means individually transforming DC components and AC components of said digital picture data to produce transformed DC component data and transformed AC component data;
   normalizing means for normalizing at least said transformed AC component data of the data transformed by said orthogonal transforming means;
   coding means for coding, from among the data transformed by said orthogonal transforming means and the data normalized by said normalizing means, at least the normalized data; and
   control means for controlling said normalizing means and said coding means so that said transformed DC component data are normalized and coded before said transformed AC component data are normalized and coded;
   said control means causing the coded DC component data to be recorded in the recording medium before the coded AC component data are recorded in the recording medium;
   said control means controlling a recording of each of the coded DC component data and the coded AC component data in the recording medium in a specific order of luminance signal data then chrominance signal data.

3. A data compressing and recording apparatus for dividing digital picture data which constitute a single picture into a plurality of blocks, applying two-dimensional orthogonal transform coding to the picture data of the individual blocks, and recording the coded picture data in a recording medium, said apparatus comprising:
   orthogonal transforming means for applying a two-dimensional orthogonal transformation to a plurality of blocks of digital picture data;

said orthogonal transforming means individually transforming DC components and AC components of said digital picture data to produce transformed DC component data and transformed AC component data;

normalizing means for normalizing at least said transformed AC component data of the data transformed by said orthogonal transforming means;

coding means for coding, from among the data transformed by said orthogonal transforming means and the data normalized by said normalizing means, at least the normalized data; and control means for controlling said normalizing means and said coding means so that said transformed DC component data are normalized and coded before said transformed AC component data are normalized and coded;

said control means causing the coded DC component data to be recorded in the recording medium before the coded AC component data are recorded in the recording medium;

said control means controlling a recording of each of the coded DC component data and the coded AC component data in the recording medium in a specific order of chrominance signal data, then luminance signal data.

4. The apparatus as claimed in claim 1, wherein individual component data are recorded on a picture basis in picture data areas within the recording medium and addresses of said individual component data are recorded in a directory area within the recording medium, said directory area being a separate physical area from said picture data areas.

5. The apparatus as claimed in claim 1, wherein said recording medium comprises a plurality of recording areas for storing the picture data, each recording area being divided into a plurality of recording units, each recording unit having a predetermined recording capacity, said picture data being recorded in said plurality of recording areas while being supervised on a recording unit level; and said recording medium further comprising an area for recording a memory allocation table, said memory allocation table indicating a relationship among the plurality of recording areas in which a group of associated data is recorded.

6. The apparatus as claimed in claim 4, wherein said recording medium comprises a plurality of recording areas for storing the picture data, each recording area being divided into a plurality of recording units, each recording unit having a predetermined recording capacity, said picture data being recorded in said plurality of recording areas while being supervised on a recording unit level;

said recording medium further comprising an area for recording a memory allocation table, said memory allocation table indicating a relationship among the plurality of recording areas in which a group of associated data is recorded; and said directory area indicating the recording area in which a leading portion of a group of associated data is recorded.

7. The apparatus as claimed in claim 6, wherein either said area for said memory allocation table or said directory area of the recording medium indicates whether or not to inhibit write-in and erasure of the recording area with which said area for said memory allocation table or said directory area is associated.

8. A method for compressing digital picture data and recording the compressed digital picture data in a recording medium, comprising the steps of:
(a) dividing the digital picture data of a single picture into a plurality of blocks;
(b) applying a two-dimensional orthogonal transform coding to the digital picture data of individual blocks, the transformation being performed individually on D.C. components and AC components of the digital picture data, thereby generating transformed DC component data and transformed AC component data;
(c) normalizing at least the transformed AC component data of the data transformed in said step (b);
(d) coding, from among the data transformed in said step (b) and the data normalized in said step (c), at least the normalized data; and
(e) recording the DC component data in the recording medium prior to recording the AC component data in the recording medium.

9. The method as claimed in claim 8, wherein said step (e) further comprises the step of:
(f) recording each of the DC component data and the AC component data in the recording medium in a specific order of luminance signal data, then chrominance signal data.

10. The method as claimed in claim 8, wherein said step (e) further comprises the step of:
(f) recording each of the DC component data and the AC component data in the recording medium in a specific order of chrominance signal data and luminance signal data.

11. The method as claimed in claim 8, wherein said step (e) further comprises the steps of:
(f) recording individual component data on a picture basis in picture data areas of the recording medium; and
(g) recording addresses of the individual component data in a directory area of the recording medium.

12. A data compressing and recording apparatus for dividing digital picture data which constitute a single picture into a plurality of blocks, applying a two-dimensional orthogonal transform coding to the picture data of individual blocks, and recording the coded picture data in a recording medium, said apparatus comprising:
orthogonal transforming means for applying a two-dimensional orthogonal transformation to a plurality of blocks of digital picture data;
said orthogonal transforming means individually transforming DC components and AC components of said digital picture data to produce transformed DC component data and transformed AC component data;
normalizing means for normalizing at least said transformed AC component data of the data transformed by said orthogonal transforming means;
coding means for coding, from among the data transformed by said orthogonal transforming means and the data normalized by said normalizing means, at least the normalized data; and
control means for controlling said normalizing means and said coding means;
said control means controlling an order of normalizing and coding of said transformed DC component data and said transformed AC component data of said digital picture data;
said control means controlling a recording of the DC component data and the AC component data in the recording medium such that the DC component data is recorded in the recording medium in a frame separate from the AC component data being recorded in the recording medium, thereby recording the DC component data at a frame having no AC component data recorded therein.

13. The data compressing and recording apparatus as claimed in claim 12, wherein said control means controls a recording of the DC component data and the AC component data in the recording medium such that the DC component data is recorded prior to the AC component data.

* * * * *